(12) United States Patent
Chen et al.

(10) Patent No.: US 10,989,392 B1
(45) Date of Patent: Apr. 27, 2021

(54) REMOVABLE MODULAR BAMBOO-BASED-BASED SOLAR LANDSCAPE LAMP

(71) Applicant: International Center for Bamboo and Rattan, Beijing (CN)

(72) Inventors: Fuming Chen, Beijing (CN); Ge Wang, Beijing (CN); Zehui Jiang, Beijing (CN); Benhua Fei, Beijing (CN); Hongxin Wu, Beijing (CN)

(73) Assignee: International Center for Bamboo and Rattan, Beijing (CN)

( * ) Notice: Subject to any disclaimer, the term of this patent is extended or adjusted under 35 U.S.C. 154(b) by 0 days.

(21) Appl. No.: 16/891,520

(22) Filed: Jun. 3, 2020

(30) Foreign Application Priority Data

Dec. 20, 2019 (CN) .......................... 201911325365.0

(51) Int. Cl.
| | |
|---|---|
| *F21V 17/00* | (2006.01) |
| *F21V 23/00* | (2015.01) |
| *F21S 8/08* | (2006.01) |
| *F21S 9/03* | (2006.01) |
| *F21V 33/00* | (2006.01) |
| *F21Y 115/10* | (2016.01) |

(52) U.S. Cl.
CPC ............ *F21V 17/005* (2013.01); *F21S 8/081* (2013.01); *F21S 9/035* (2013.01); *F21V 23/003* (2013.01); *F21V 33/0056* (2013.01); *F21Y 2115/10* (2016.08)

(58) Field of Classification Search
CPC ......... F21W 2131/109; F21W 2131/10; F21V 21/0824; F21V 21/22
USPC ......................................................... 362/431
See application file for complete search history.

(56) References Cited

U.S. PATENT DOCUMENTS

| 5,980,057 | A | * | 11/1999 | Christie | .............. | F21V 33/0056 |
| | | | | | | 362/234 |
| 9,416,931 | B1 | * | 8/2016 | Ross | ........................ | F21S 6/005 |
| 2003/0137847 | A1 | * | 7/2003 | Cooper | ................ | F21V 21/088 |
| | | | | | | 362/418 |
| 2005/0013137 | A1 | * | 1/2005 | Burton, Jr. | .......... | F21V 21/0824 |
| | | | | | | 362/431 |
| 2016/0040841 | A1 | * | 2/2016 | Martzall | ................ | H05B 47/11 |
| | | | | | | 362/183 |

* cited by examiner

*Primary Examiner* — William J Carter
(74) *Attorney, Agent, or Firm* — M&B IP Analysts, LLC

(57) ABSTRACT

A removable modular bamboo-based solar landscape lamp is provided. The lamp includes a base, a bamboo-based pole, a bamboo-based beam, a bamboo-based sparrow brace, an LED lamp, a solar power system, and a control module, where a lower end of the bamboo-based pole is disposed on the base, an upper end of the bamboo-based pole is vertically connected to the bamboo-based beam, and the solar power system is disposed above the bamboo-based beam; the LED lamp is disposed under one side of the bamboo-based beam, and the bamboo-based sparrow brace is disposed on a joint between the other side of the bamboo-based beam and the bamboo-based pole; the solar power system is used to supply power to the LED lamp, the solar power system, and the control module; the control module may control on and off of the LED lamp.

13 Claims, 9 Drawing Sheets

REMOVABLE MODULAR BAMBOO-BASED-BASED SOLAR LANDSCAPE LAMP

TECHNICAL FIELD

The disclosed embodiments relate to the field of environmental lighting appliances, and specifically, to a removable modular bamboo-based solar landscape lamp.

BACKGROUND

Pole materials of outdoor street lamps mainly include cement, iron, glass fibers, stainless steel, and aluminum alloys. At present, iron street lamp poles are the most widely used on the market, which are manufactured by rolling and welding high-quality Q235 steel and then through hot-dip galvanization and plastic spraying. However, the iron street lamp poles are prone to corrosion for long-term use. Cement street lamp poles are out-of-dated due to heavy weights, high dangers, and inconvenient transportation. Even though glass fiber reinforced plastic poles have desirable insulation performance, heat resistance, and corrosion resistance, and high strength, such a material is brittle and presents relatively poor abrasion resistance. Therefore, there are few glass fiber reinforced plastic poles on the market. Made of high-strength aluminum alloys, aluminum alloy street lamp poles have strong corrosion resistance and desirable decorative effects. However, there are high costs and environmental pollution in the manufacturing processes. As hot-dip galvanization is performed on surfaces, stainless steel lamp poles present desirable chemical and electrochemical corrosion resistance with a product life of up to 15 years. However, there are also concerns about energy saving, ecological protection, and environment protection.

SUMMARY

The embodiments disclosed herein provide a removable modular bamboo-based solar landscape lamp. For the landscape lamp, functional units to be assembled are pre-manufactured into standard members in a factory. Especially for an overlong and overweight lamp pole component, a structure with upper and lower poles is used for on-site assembly, thereby leading to high installation efficiency and recyclability. A bamboo-based pole, a bamboo-based beam, and a bamboo-based sparrow brace are manufactured by machining high-weather-resistant bamboo scrimber or bamboo-based bundle laminated veneer lumber with enhanced uniformity and decreased density, which presents desirable weather resistance, high dimensional stability, and a long service life.

A technical solution of the disclosed embodiments to resolve the foregoing problem is: a removable modular bamboo-based solar landscape lamp, including: a base, a bamboo-based pole, a bamboo-based beam, a bamboo-based sparrow brace, an LED lamp, a solar power system, and a control module, where a lower end of the bamboo-based pole is disposed on the base, an upper end of the bamboo-based pole is vertically connected to the bamboo-based beam, and the solar power system is disposed above the bamboo-based beam; the LED lamp is disposed under one side of the bamboo-based beam, and the bamboo-based sparrow brace is disposed on a joint between the other side of the bamboo-based beam and the bamboo-based pole; the solar power system is used to supply power to the LED lamp, the solar power system, and the control module; the control module controls on and off of the LED lamp; the bamboo-based pole includes an upper pole and a lower pole, and a lower portion of the upper pole is fixedly inserted into an upper portion of the lower pole; two movable positioning keys are disposed on the lower portion of the upper pole, a compression spring is disposed between the two positioning keys, two positioning slots matching the positioning keys are disposed on the upper portion of the lower pole, and when the upper pole is inserted downwards into the lower pole, the positioning keys are clamped in the positioning slots, and in this way, assembly of the bamboo-based pole is completed; and a lower portion of the bamboo-based beam is provided with a hole, a top portion of the upper pole is inserted into the hole in the lower portion of the bamboo-based beam, the top portion of the upper pole is provided with an insertion hole, a positioning pin is inserted into a back end of the bamboo-based beam, and passes through the insertion hole in the top portion of the upper pole.

Further, both the upper pole and the lower pole are of a rectangular tube structure, and four surfaces thereof are all made of bamboo-based boards and spliced by using mortise and tenon joints, and a connection portion between the upper and lower poles, and an internal portion and an external portion of the mortise and tenon joint are coated with laminating glue and waterproofing agents for sealing.

Further, the base includes a bottom plate and a side plate, the side plate is vertically fixed on the bottom plate, and a stiffener is further disposed between the bottom plate and the side plate.

Further, the solar power system includes a solar panel, a storage battery, and an automatic charging and discharging system.

Further, the control module includes a plurality of control manners such as a light control module, and/or an infrared sensing module, and/or a manual switch.

Further, a wireless broadcast sound system is further included.

Further, the wireless broadcast sound system uses a radio frequency FM transceiver module and a power amplification circuit, so that wireless remote broadcasting can be implemented.

Further, a lampshade is disposed on the LED lamp; and the infrared sensor is disposed at the bottom of the lampshade, and the control module and the wireless broadcast sound system are disposed inside the bamboo-based beam.

Further, the bamboo-based pole, the bamboo-based beam, and the bamboo-based sparrow brace are manufactured by machining high-weather-resistant bamboo scrimber or bamboo-based bundle laminated veneer lumber with enhanced uniformity and decreased density. The disclosed embodiments may provide the following benefits:

(1) Aesthetic appearance. An environmental bamboo-based material is used as the lamp pole designed according to an embodiment with a retro design which is novel and aesthetic.

(2) Long service life. The bamboo scrimber and bamboo-based bundle laminated veneer lumber utilized by an embodiment has excellent strength and weather resistance and a service life of more than 30 years.

(3) High installation efficiency. Functional units of the removable modular bamboo-based solar landscape lamp are standardized and pre-manufactured in a factory, and then modularly assembled and connected on site with high installation efficiency. In addition, mechanical connections are easy to remove.

(4) Environmental protection and energy saving. Solar power is supplied with no need of mains electricity, thereby facilitating easy installation, reducing energy consumption, and helping for environmental protection. Strong promotion and widespread use of bamboo-based products can fix more carbon elements for the earth, and reduce CO2 emissions, which presents significant advantages in a reduction in global low-carbon emissions. The lamp pole made of new bamboo-based materials has a long service life, and the materials cause no pollution to the environment after being scrapped.

(5) Low costs. At present, most of street lamp poles on the market are made of metal materials, which are expensive to manufacture and prone to rust and corrosion after long-term use.

(6) Convenient and safe disassembly for recycling.

(7) Diversified functions. The street lamp has a built-in FM broadcast system, which can realize a remote one-to-many wireless sound broadcast function.

DETAILED DESCRIPTION

Figure 1:
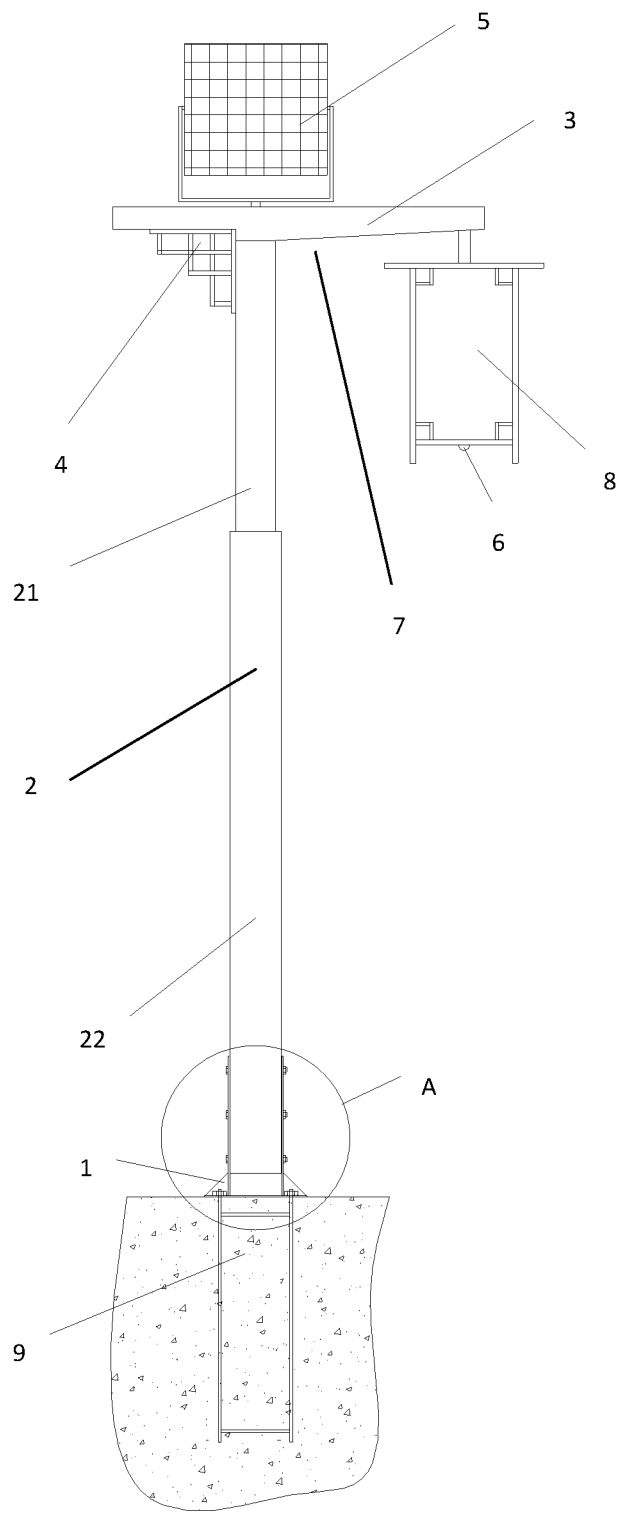
FIG. 1 is an entire structural diagram of a removable modular bamboo-based solar landscape lamp according to the present utility model.
Figure 2:
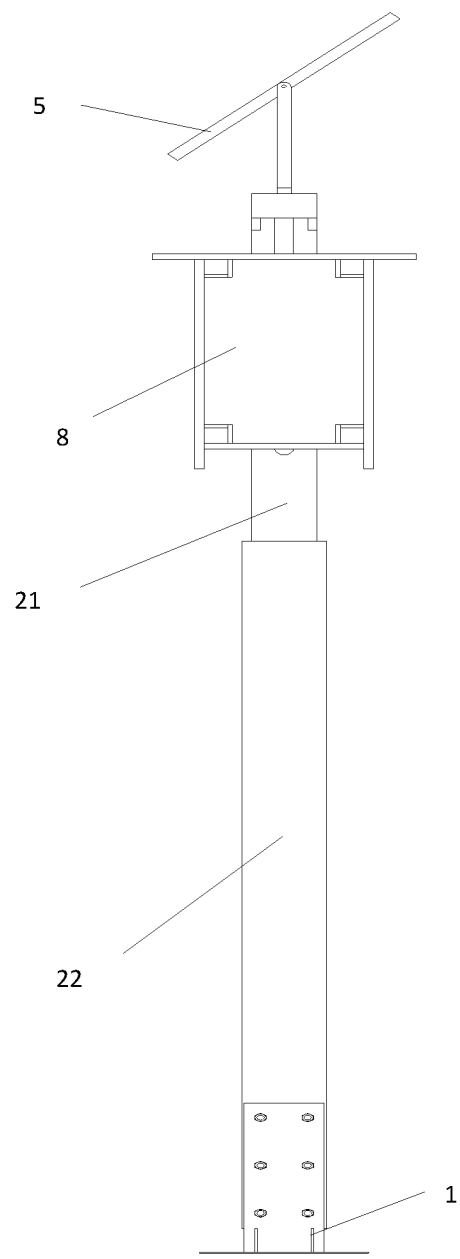
FIG. 2 is a right view of FIG. 1.

In order to make the objectives, technical solutions and advantages of the examples of the disclosed embodiments clearer, the following clearly and completely describes the technical solutions in the examples of the disclosed embodiments with reference to accompanying drawings in the examples of the disclosed embodiments. Apparently, the described examples are some rather than all of the examples. All other examples obtained by a person of ordinary skill in the art based on the examples of the disclosed embodiments without creative efforts shall fall within the protection scope of the disclosed embodiments. Therefore, the following detailed description of the examples of the disclosed embodiments in the accompanying drawings is not intended to limit the protection scope of the disclosed embodiments, but merely represent selected examples of the disclosed embodiments.

As a characteristic resource of China, bamboo-based has been the basic means of production and living since ancient times. Modern machining technologies make bamboo-based a green industrial material that can be industrialized. Especially in energy saving, consumption reduction, environmental protection, innovative use of bamboo-based fiber composite materials meets strategic needs of national green development. Bamboo scrimber and bamboo-based bundle veneer laminated veneer lumber are high-performance bamboo-based fiber composite materials independently developed by China. Fibration and fine fluffing are performed on bamboo-based materials, thereby greatly increasing utilization of the bamboo-based materials. The bamboo-based materials are impregnated with water-soluble phenolic resin having a low molecular weight, to give full play to high mechanical properties of bamboo-based fibers and enhance impregnation and wrapping by resin on fiber cell walls. Compared with traditional anti-corrosion wood, bamboo scrimbers have advantages of high strength, good durability, higher strength, stronger weather resistance, and less consumption of environmental resources, and therefore, are widely used in outdoor flooring, outdoor furniture, fabricated buildings, corridors and courtyards, large-span public buildings, and other fields.

In an embodiment, modular components of bamboo-based-based fiber composite materials are combined with solar energy systems to produce energy-saving and environmentally-friendly outdoor landscape lamps, to meet requirements of green materials, energy saving, consumption reduction, and cultural experience in scenic spots, archaizing bed and breakfasts, Chinese-style buildings, and the like. The power supply system can be conveniently placed on both sides of suburban roads with inconvenient traffic and no municipal power. The products are simple and beautiful, with a long design life, high assembly efficiency, easy maintenance, and a wide application range.

Referring to FIG. 1 to FIG. 11, a removable modular bamboo-based solar landscape lamp is provided, including a base 1, a bamboo-based pole 2, a bamboo-based beam 3, a bamboo-based sparrow brace 4, an LED lamp, a solar power system, a control module, and a wireless broadcast sound system 7.

A lower end of the bamboo-based pole 2 is disposed on the base 1, an upper end of the bamboo-based pole 2 is vertically connected to the bamboo-based beam 3, and the solar power system is disposed above the bamboo-based beam 3. The LED lamp is disposed under one side of the bamboo-based beam 3, and the bamboo-based sparrow brace 4 is disposed on a joint between the other side of the bamboo-based beam 3 and the bamboo-based pole 2. The solar power system is used to supply power to the LED lamp, the solar power system, and the control module. The control module may control on and off of the LED lamp. The solar power system includes a solar panel 5, a storage battery, and an automatic charging and discharging system. Specifically, the solar power system is equipped with an 80 W polycrystalline silicon solar panel and a 120 AH lithium battery. The solar power system, together with the solar automatic charging and discharging system, can ensure that the street lamp can maintain continuous illumination of a rainy night for a week after being fully charged.

The control module includes a plurality of control manners such as a light control module, an infrared sensing module 6, and a manual switch. Mode switching can be randomly performed by using the switch, to flexibly meet use requirements in different scenarios.

The wireless broadcast sound system 7 uses a radio frequency FM transceiver module and a power amplification circuit, so that wireless remote broadcasting can be implemented.

A lampshade 8 is disposed on the LED lamp. Specifically, the lampshade 8 is formed by performing die-casting on aluminum alloys, and is protected by using transparent and waterproofing acrylic. A 12V replaceable LED lamp and the infrared sensing module 6 are built in the lampshade 8.

The bamboo-based pole 2 includes an upper pole 21 and a lower pole 22, and a lower portion of the upper pole 21 is fixedly inserted into an upper portion of the lower pole 22. Two movable positioning keys 23 are disposed on the lower portion of the upper pole 21, a compression spring 24 is disposed between the two positioning keys 23, and two positioning slots 25 matching the positioning keys 23 are disposed on the upper portion of the lower pole 22. When the upper pole 21 is inserted downwards into the lower pole 22, the positioning keys 23 are clamped in the positioning slots 25, and in this way, assembly of the bamboo-based pole is completed. A lower portion of the bamboo-based beam 3 is provided with a hole, a top portion of the upper pole 21 is inserted into the hole in the lower portion of the bamboo-based beam 3, the top portion of the upper pole 21 is provided with an insertion hole, a back end of the bamboo-based beam 3 is inserted into a positioning pin 31, and the positioning pin 31 passes through the insertion hole in the top portion of the upper pole 21.

A material of the bamboo-based pole 2, the bamboo-based beam 3, and the bamboo-based sparrow brace 4 is high-weather-resistant bamboo scrimber or bamboo-based bundle laminated veneer lumber with enhanced uniformity and decreased density. Specifically, both the upper pole 21 and the lower pole 22 are of a rectangular tube structure, and four surfaces thereof are spliced by using mortise and tenon joints. The bamboo-based pole 2 is formed by splicing bamboo scrimbers with a thickness of 20 mm and mechanically machined mortise and tenon joints by using laminating glue. Corrosion prevention and sealing are performed on an external portion, thereby bringing strong weather resistance.

Figure 3:
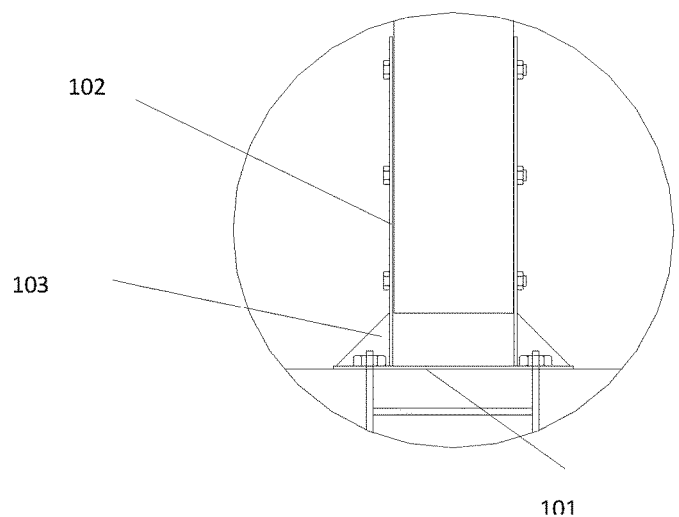
FIG. 3 is an enlarged view of a position A in FIG. 1.
Figure 4:
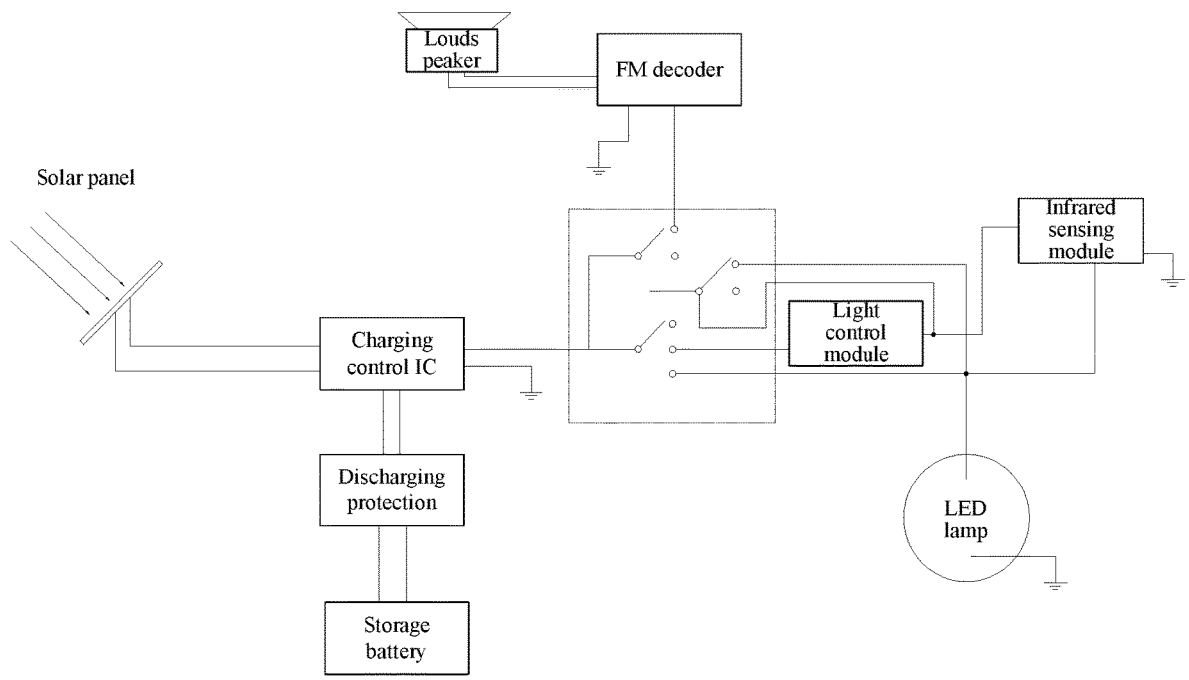
FIG. 4 is a connection diagram of circuits in a removable modular bamboo-based solar landscape lamp according to the present utility model.
Figure 5:
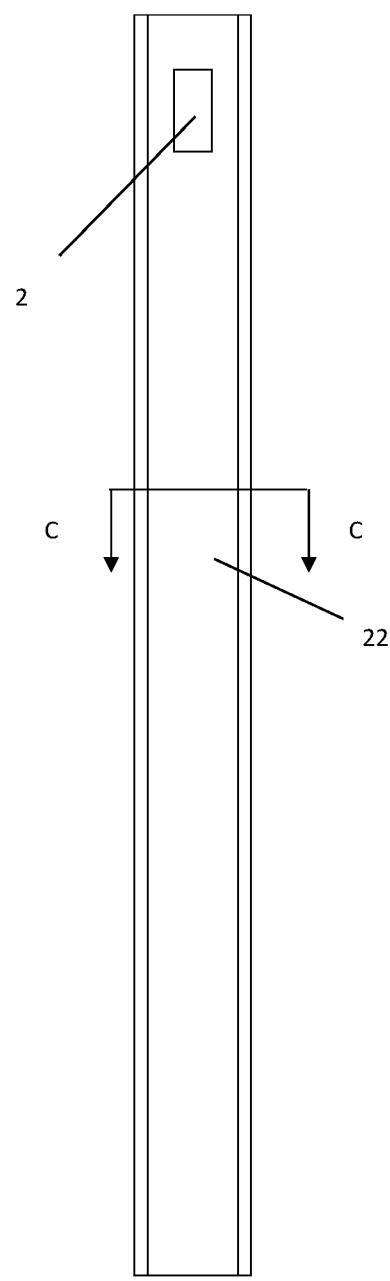
FIG. 5 is an axial sectional view of a lower pole in FIG. 1.
Figure 6:
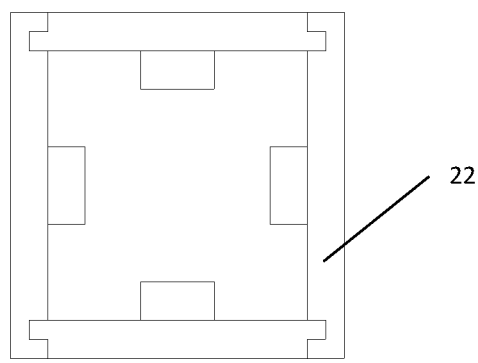
FIG. 6 is a sectional view in a direction C-C in FIG. 5.
Figure 7:
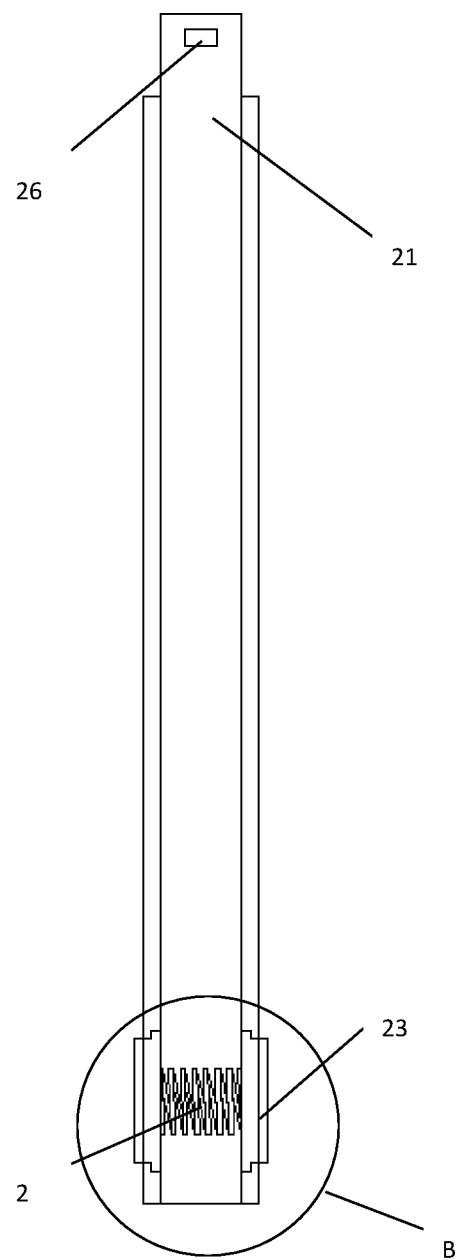
FIG. 7 is a diagram of manufacturing and assembling an upper bamboo-based pole.
Figure 8:
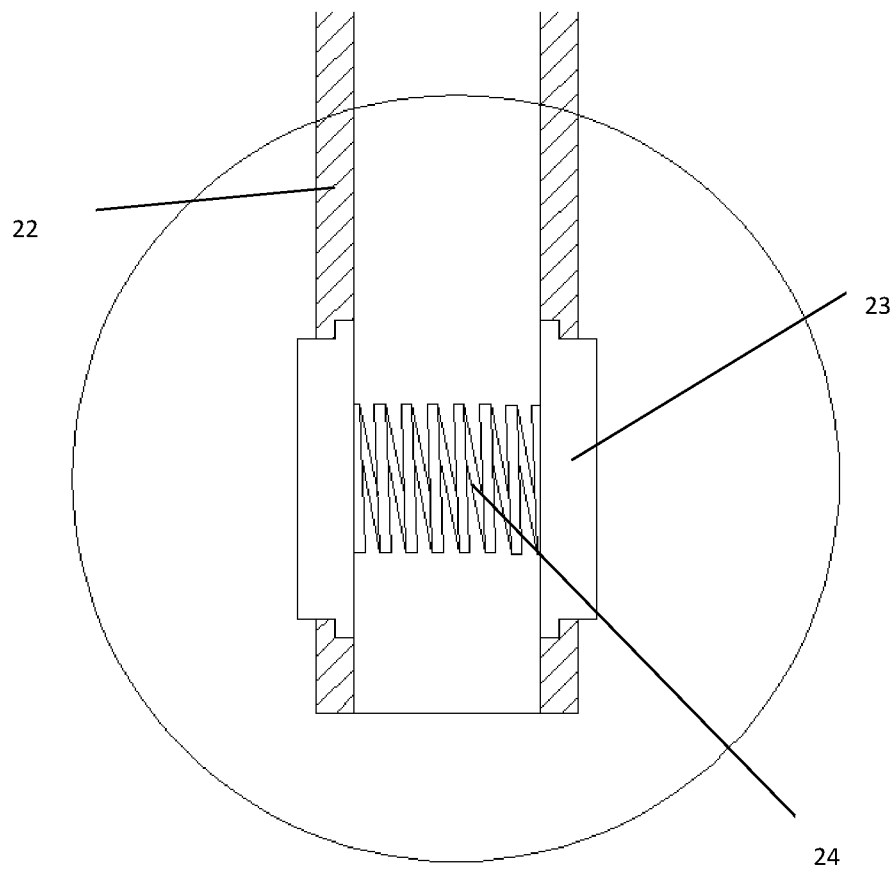
FIG. 8 is an enlarged view of a position B in FIG. 7.
Figure 9:
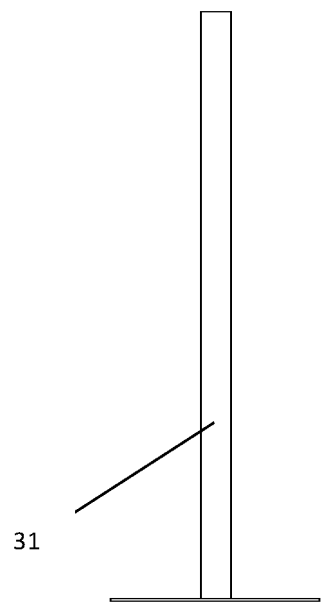
FIG. 9 is a structural diagram of a positioning pin.
Figure 10:
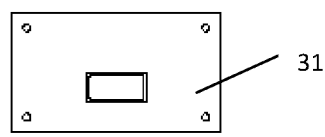
FIG. 10 is a bottom view of FIG. 9.
Figure 11:
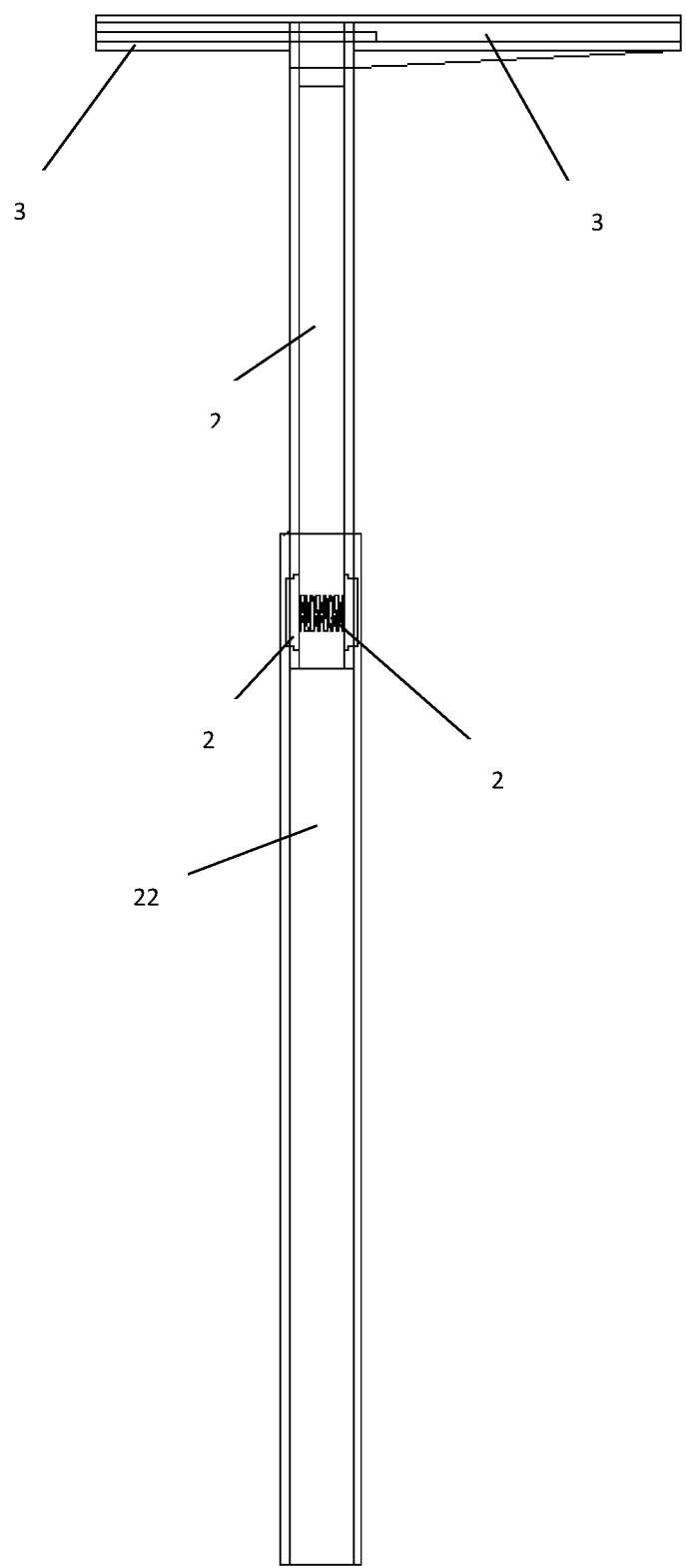
FIG. 11 is a diagram of assembling a bamboo-based beam, an upper pole, and a lower pole, where 1—base, 2—bamboo-based pole, 3—bamboo-based beam, 4—bamboo-based sparrow brace, 5—solar panel, 6—infrared sensing module, 7—wireless broadcast sound system, 8—lampshade, 9—pre-buried foundation, 21—upper pole, 22—lower pole, 23—positioning key, 24—compression spring, 25—positioning slot, 26—insertion hole, 31—positioning pin, 101—bottom plate, 102—side plate, and 103—stiffener.

Referring to FIG. 3, the base 1 includes a bottom plate 101 and a side plate 102, the side plate 102 is vertically fixed on the bottom plate 101, and a stiffener 103 is further disposed between the bottom plate 101 and the side plate 102.

A working principle of a removable modular bamboo-based solar landscape lamp by the disclosed embodiment is as follows:

The solar panel 5 on a top portion of the street lamp converts daytime light into electrical energy, charges a storage battery through adjustment of a charging control IC, and stores the electrical energy in the storage battery. The charging control IC automatically controls a charging voltage and a charging current of the storage battery, and automatically stops charging after the storage battery is fully charged. The charging control IC uses the charging controller BL912 from Guangzhou Lanrui Electronics Co., Ltd.

In a full-bright mode, after it gets dark, the light control module detects insufficient ambient illumination, circuits are connected, and street lamps start to work. After dawn, the light control module detects that ambient illumination exceeds a specified threshold, the circuits are disconnected, and the street lamps go out. The light control module uses a light sensing switch with a model of JB-10-12 produced by Shenzhen Jiatelun Electronic Technology Co., Ltd.

In an infrared sensing mode, a street lamp lights up at night only when a pedestrian approaches a street lamp and the infrared sensing module 6 receives a thermal infrared electromagnetic wave emitted by a human body, and goes out after a delay of 60 s after the infrared sensing module 6 senses that the human body has left. When this mode is enabled, a service life of the battery can be prolonged. The infrared sensing module uses the infrared human body sensing module SL622 produced by Shenzhen Sensorcn Technology Co., Ltd.

Discharging protection monitors a capacity of the battery in real time. When a battery level is low, the lamp is forcibly powered off to protect the lithium battery. The discharging protection uses the lithium battery protection IC BMS-20A-3S-EFJ produced by Shenzhen Hengxuhui Technology Co., Ltd.

After the wireless broadcast sound system 7 is turned on, the system automatically captures a specified frequency band. When a broadcast signal is sent from a wireless transmitter, the wireless broadcast sound system is turned on for automatic broadcasting. The wireless broadcast sound system uses the wireless broadcast sound system RDA5820 from Shenzhen Weixue Electronics Co., Ltd.

In an embodiment, a manufacturing process of a removable modular bamboo-based solar landscape lamp includes:

1. Material Preparation (1) Integrate bamboo bundle veneers. Scattered bamboo is divided into sections, and the bamboo bundle veneers designed with a composite structure can be obtained through fine fiber fibrillation, integration of bamboo bundles with enhanced uniformity and decreased density, and evaluation and grading based on density of bamboo bundle fiber veneers. Preferably, multi-grade fine fibrillation is performed on bamboo bundle veneers on an outer side of bamboo, to obtain more uniform fibers with a smaller granularity.

(2) Quantitative sizing of the bamboo bundle veneers. Preferably, the bamboo bundle veneers close to the outer side of bamboo are impregnated with a high curing quantity of phenolic resin (with a solid content of 25% to 45%), and an adhesive impregnation quantity is controlled from 15 to 33%. Bamboo bundle veneers close to an inner side are impregnated with a relatively low curing quantity of phenolic resin (with a solid content of 10% to 20%), and an adhesive impregnation quantity is controlled from 8% to 17%.

(3) Optimize laminating and composition. The bamboo bundle veneers on the outer side of bamboo with the high impregnation quantity are used as an outermost laminating layer, and the bamboo bundle veneers on the inner side of bamboo with the low impregnation quantity are used as the core layer together with artificial wood veneers.

Hot-pressing molding. The bamboo bundle veneers are laminated, spread, and subject to hot-pressing molding with target density of 0.95 g/cm3 to 1.25 g/cm3, a hot target thickness of 20 mm, hot-pressing temperature of 140° to 150°, and a hot-pressing time of 30 min to 60 min (5) Display, sanding, painting and protection treatment After being stacked and displayed for more than 48 h with surfaces sanded and smeared for the second time for photocuring, the veneer materials on which hot-pressing molding is performed are brushed or impregnated with protective agents.

2. Blanking

According to size requirements, the bamboo scrimber or bamboo bundle veneer laminated veneer lumber is blanked, tenoned and mortised, polished, and buffed to achieve the corresponding size requirements.

3. Splicing

An appropriate quantity of weather-resistant laminating glue (an isocyanate cross-linking agent is added during use) is smeared before the veneer materials are spliced by using tenon and mortise joints. Corresponding components are spliced together according to requirements, and pressed in place with a tooling for more than 4 hours. After the glue is completely cured, the tooling is removed. The upper pole 21, the lower pole 22, and the bamboo-based beam 3 are separately spliced.

4. Base Manufacturing

Numerical control blanking is performed on 5 MM Q235 steel plates, spot welding is performed on components to a limiting tooling, and welding is then performed after qualified sizes are ensured. During welding, according to a process, corresponding shrinkage allowances are reserved. After welding, polishing is performed to present at least metallic luster, welding slags are removed, and the entire base is smeared with black cold galvanizing paint for anti-rust treatment.

5. Assembly (Installation Site)

The two positioning keys 23 at the lower portion are pressed, and the upper pole 21 is inserted into the lower pole 22 until the positioning key 23 springs up, so that the upper pole 21 is fixed in the positioning slots 25. The bamboo-based beam 3 is placed on the upper pole 21, the top portion of the upper pole 21 is inserted into the hole of the bamboo-based beam 3, and the positioning pin 31 is inserted into the beam from the back to pass through the insertion hole on the top portion of the upper pole 21.

6. Anti-Corrosion and Sealing (Installation Site)

A mildew inhibitor formulated with ethanol is added to wax oil, and then all outer surfaces of the lamp pole are smeared twice. After the surfaces is completely dry after first smearing is completed, the surfaces are smeared with the wood wax oil for a second time. Structural adhesives are applied to seams between the upper pole 21 and the lower pole 22, and seams between the upper pole 21 and the bamboo-based beam 3 for sealing, to ensure that water on a surface of a lamp pole will not penetrate into an interior of the lamp pole.

7. Installation and Debugging (Installation Site)

A foundation 9 is pre-buried. The base 1 of the street lamp is fixed on the bamboo-based pole 2, locked by using 6 sets of nuts and bolts, and is inserted at a corresponding position of the pre-buried foundation 9. After verticality of the bamboo-based pole 2 is calibrated, the bamboo-based pole 2 is tightly locked on the base 1 with a nut. A distance between a lowest surface of the bamboo-based pole and the ground should be greater than 85 mm.

The lampshade 8 and a solar cell assembly are respectively installed at corresponding positions. The solar panel 5 is kept at an angle of 45° to the horizontal line and faces south. Wiring harnesses are connected and circuits are debugged.

The foregoing is examples of the disclosed embodiments and does not constitute a limitation on the protection scope of the disclosed embodiments. Any equivalent structure or equivalent process change made by using the description and the accompanying drawings of the disclosed embodiments, or direct or indirect application thereof in other related technical fields, shall still fall in the protection scope of the patent of the disclosed embodiments.

What is claimed is:

1. A removable modular bamboo-based solar landscape lamp, comprising:
    a base, a bamboo-based pole, a bamboo-based beam, a bamboo-based sparrow brace, an LED lamp, a solar power system, and a control module, wherein
    a lower end of the bamboo-based pole is disposed on the base, an upper end of the bamboo-based pole is vertically connected to the bamboo-based beam, and the solar power system is disposed above the bamboo-based beam; the LED lamp is disposed under one side of the bamboo-based beam, and the bamboo-based sparrow brace is disposed on a joint between the other side of the bamboo-based beam and the bamboo-based pole;
    the solar power system is used to supply power to the LED lamp, the solar power system, and the control module;
    the control module controls on and off of the LED lamp;
    the bamboo-based pole comprises an upper pole and a lower pole, and a lower portion of the upper pole is fixedly inserted into an upper portion of the lower pole; and
    two movable positioning keys are disposed on the lower portion of the upper pole, a compression spring is disposed between the two positioning keys, and two positioning slots matching the positioning keys are disposed on the upper portion of the lower pole;
    a lower portion of the bamboo-based beam is provided with a hole, a top portion of the upper pole is inserted into the hole in the lower portion of the bamboo-based beam, the top portion of the upper pole is provided with an insertion hole, a positioning pin is inserted into a back end of the bamboo-based beam, and passes through the insertion hole in the top portion of the upper pole, wherein both the upper pole and the lower pole are of a rectangular tube structure, and four surfaces thereof are all made of bamboo-based boards and spliced by using mortise and tenon joints.

2. The removable modular bamboo-based solar landscape lamp according to claim 1, wherein the base comprises a bottom plate and a side plate, the side plate is vertically fixed on the bottom plate, and a stiffener is further disposed between the bottom plate and the side plate.

3. The removable modular bamboo-based solar landscape lamp according to claim 2, wherein the solar power system comprises a solar panel, a storage battery, and an automatic charging and discharging system.

4. The removable modular bamboo-based solar landscape lamp according to claim 3, wherein the control module comprises a light control module, and/or an infrared sensing module, and/or a manual switch.

5. The removable modular bamboo-based solar landscape lamp according to claim 4, further comprising:
    a wireless broadcast sound system.

6. The removable modular bamboo-based solar landscape lamp according to claim 5, wherein the wireless broadcast sound system uses a radio frequency FM transceiver module and a power amplification circuit, so that wireless remote broadcasting can be implemented.

7. The removable modular bamboo-based solar landscape lamp according to claim 6, wherein a lampshade is disposed on the LED lamp; and
    the infrared sensing module is disposed at the bottom of the lampshade.

8. The removable modular bamboo-based solar landscape lamp according to claim 1, wherein the solar power system comprises a solar panel, a storage battery, and an automatic charging and discharging system.

9. The removable modular bamboo-based solar landscape lamp according to claim 8, wherein the control module comprises a light control module, and/or an infrared sensing module, and/or a manual switch.

10. The removable modular bamboo-based solar landscape lamp according to claim 9, further comprising:
a wireless broadcast sound system.

11. The removable modular bamboo-based solar landscape lamp according to claim 10, wherein the wireless broadcast sound system uses a radio frequency FM transceiver module and a power amplification circuit, so that wireless remote broadcasting can be implemented.

12. The removable modular bamboo-based solar landscape lamp according to claim 11, wherein a lampshade is disposed on the LED lamp; and
the infrared sensing module is disposed at the bottom of the lampshade.

13. The removable modular bamboo-based solar landscape lamp according to claim 12, wherein the bamboo-based pole, the bamboo-based beam, and the bamboo-based sparrow brace are made of high-weather-resistant bamboo scrimber or bamboo-based bundle laminated veneer lumber with enhanced uniformity and decreased density.

* * * * *